US012810515B2

(12) United States Patent
Bell-Geddes et al.

(10) Patent No.: US 12,810,515 B2
(45) Date of Patent: Nov. 24, 2026

(54) KINEMATIC JOINT AND CHAIN PHYSICS TOOLS FOR AUGMENTED REALITY

(71) Applicants: Lemon Inc., Grand Cayman (KY); Beijing Zitiao Network Technology Co., Ltd., Haidian District (CN)

(72) Inventors: Weston Bell-Geddes, Los Angeles, CA (US); Yili Zhao, Los Angeles, CA (US); Jie Li, Los Angeles, CA (US); Yunpeng Jing, Los Angeles, CA (US); Liyou Xu, Beijing (CN); Zhili Chen, Los Angeles, CA (US); Kexin Lin, Los Angeles, CA (US); Jingcong Zhang, Los Angeles, CA (US); Kewei Chen, Beijing (CN)

(73) Assignees: Lemon Inc., Grand Cayman (KY); Beijing Zitiao Network Technology Co., Ltd., Beijing (CN)

( * ) Notice: Subject to any disclaimer, the term of this patent is extended or adjusted under 35 U.S.C. 154(b) by 318 days.

(21) Appl. No.: 18/317,802

(22) Filed: May 15, 2023

(65) Prior Publication Data

US 2024/0331246 A1 Oct. 3, 2024

Related U.S. Application Data

(60) Provisional application No. 63/493,296, filed on Mar. 30, 2023.

(51) Int. Cl.

| | |
|---|---|
| ***G06T 13/20*** | (2011.01) |
| ***G06F 3/04847*** | (2022.01) |
| ***G06T 19/00*** | (2011.01) |

(52) U.S. Cl.

CPC .......... *G06T 13/20* (2013.01); *G06F 3/04847* (2013.01); *G06T 19/006* (2013.01); *G06T 2200/24* (2013.01)

(58) Field of Classification Search

None

See application file for complete search history.

(56) References Cited

U.S. PATENT DOCUMENTS

| | | | | |
|---|---|---|---|---|
| 2009/0309882 A1* | 12/2009 | Kanyuk | .................. | G06T 13/20 345/474 |
| 2010/0122243 A1* | 5/2010 | Breton | ................ | G06F 9/44505 717/163 |

(Continued)

FOREIGN PATENT DOCUMENTS

| | | | |
|---|---|---|---|
| CN | 106471505 A | 3/2017 | |
| CN | 112843704 A | 5/2021 | |
| CN | 112891954 A * | 6/2021 | ........... A63F 13/825 |

OTHER PUBLICATIONS

Byoungwon Choe, Min Gyu Choi, and Hyeong-Seok Ko. 2005. Simulating complex hair with robust collision handling. In Proceedings of the 2005 ACM SIGGRAPH/Eurographics symposium on Computer animation (SCA '05). ACM, 153-160. https://doi.org/10.1145/107336 (Year: 2005).*

(Continued)

*Primary Examiner* — Tammy Goddard
*Assistant Examiner* — Benjamin Tom Statz
(74) *Attorney, Agent, or Firm* — Alleman Hall LLP

(57) ABSTRACT

Examples are provided relating to kinematic joint and chain physics tools for augmented reality implementations. One aspect includes a computing device for kinematic joint simulation, the computing device comprising a display and a processor coupled to a storage system that stores instructions, which, upon execution by the processor, cause the processor to present a chain simulation interface comprising a plurality of graphical control elements, each graphical control element configured to adjust at least one physical parameter, receive a selection from a user using the plurality of graphical control elements, update a chain model based (Continued)

on the received selection, and display and animate the updated chain model on the display using a physics engine during a kinematic motion simulation, wherein the chain model comprises a plurality of rigid body mesh models chained together by spring elements arranged in a tree configuration, to thereby form a rigged skeleton.

20 Claims, 10 Drawing Sheets

(56) References Cited

U.S. PATENT DOCUMENTS

2010/0289807 A1* 11/2010 Yu ....................... G06F 3/04847 345/173
2014/0136557 A1* 5/2014 Lilienthal ................. G06F 7/58 707/754
2023/0074826 A1* 3/2023 Zohar ..................... G06T 19/20
2023/0177631 A1* 6/2023 Tatunashvili ....... G06F 9/44505 705/326

OTHER PUBLICATIONS

Hardman, Casey (2020). Force Fields and Jump Pads. In: Game Programming with Unity and C#. Apress, Berkeley, CA. https://doi.org/10.1007/978-1-4842-5656-5_40 (Year: 2020).*

Bertails et al. "Adaptive Wisp Tree: a multiresolution control structure for simulating dynamic clustering in hair motion". SCA '03 (Jul. 26, 2003), pp. 207-213. https://dl.acm.org/doi/10.5555/846276.846305 (Year: 2003).*

ISA China National Intellectual Property Administration, International Search Report Issued in Application No. PCT/CN2024/081640, Apr. 28, 2024, WIPO, 3 pages.

* cited by examiner

KINEMATIC JOINT AND CHAIN PHYSICS TOOLS FOR AUGMENTED REALITY

CROSS REFERENCE TO RELATED APPLICATIONS

This application claims priority to U.S. Provisional Patent Application Ser. No. 63/493,296, filed Mar. 30, 2023, the entirety of which is hereby incorporated herein by reference for all purposes.

BACKGROUND

The field of augmented reality (AR) has seen significant advancements in recent years. AR is an interactive integration of digital content through various sensory modalities. One type of implementation of AR includes the visual overlay of digital content onto the physical world, typically the user's environment, in real-time. The experience can be provided, for example, in mobile devices that are equipped with cameras that capture an image of the environment and display overlaid digital content, or by see-through displays such as eyeglasses and head-up displays that display digital content while also allowing the user to view the physical environment through transparent lenses.

SUMMARY

Examples are provided relating to kinematic joint and chain physics tools for augmented reality implementations. One aspect includes a computing device for kinematic joint simulation, the computing device comprising a display and a processor coupled to a storage system that stores instructions, which, upon execution by the processor, cause the processor to present a chain simulation interface comprising a plurality of graphical control elements, each graphical control element configured to adjust at least one physical parameter, receive a selection from a user using the plurality of graphical control elements, update a chain model based on the received selection, and display and animate the updated chain model on the display using a physics engine during a kinematic motion simulation, wherein the chain model comprises a plurality of rigid body mesh models chained together by spring elements arranged in a tree configuration, to thereby form a rigged skeleton, where movement of a parent rigid body mesh model during the kinematic motion simulation generates forces in at least one adjoining spring element that in turn induces movement of a dependent rigid body mesh model.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Augmented reality is an expanding field with many different applications across various platforms. As an emerging technology, several aspects of AR applications still lack development. For example, physics simulations of objects in AR display applications can be a difficult and time-consuming task. As a more specific example, the implementation of kinematic joint and chain physics, such as the representations of physical hinges using dynamic chains, in AR can require a high level of technical expertise and complex coding. This can limit the types of interactions and movements that can be achieved in AR experiences.

In view of the observations above, examples relating to kinematic joint and chain physics tools for augmented reality applications are provided. In many implementations, a kinematic model development tool package is provided. The tool package can include various tools that enable developers and users to implement kinematic modeling and simulations. In some examples, the tool package includes a dynamic chain tool for implementing kinematic joint and chain physics for various applications, including but not limited to AR. The dynamic chain tool addresses the current challenges in implementing kinematic joint and chain physics in AR by streamlining the technical process of generating and simulating a chain model. Some aspects of such implementations include the use of customizable and kinematic joint and dynamic chain elements. The tool can be implemented with additional flexibility and customization by enabling the adjustment of various physical parameters, which would allow for a greater range of dynamic movements and interactions in AR experiences. By presenting a simplified user interface with predefined options, such tools make implementing kinematic joint and chain physics more accessible to a wider range of developers and users, allowing them to create more realistic and engaging AR experiences with less technical expertise and complexity required to implement the physics simulation.

Figure 1:
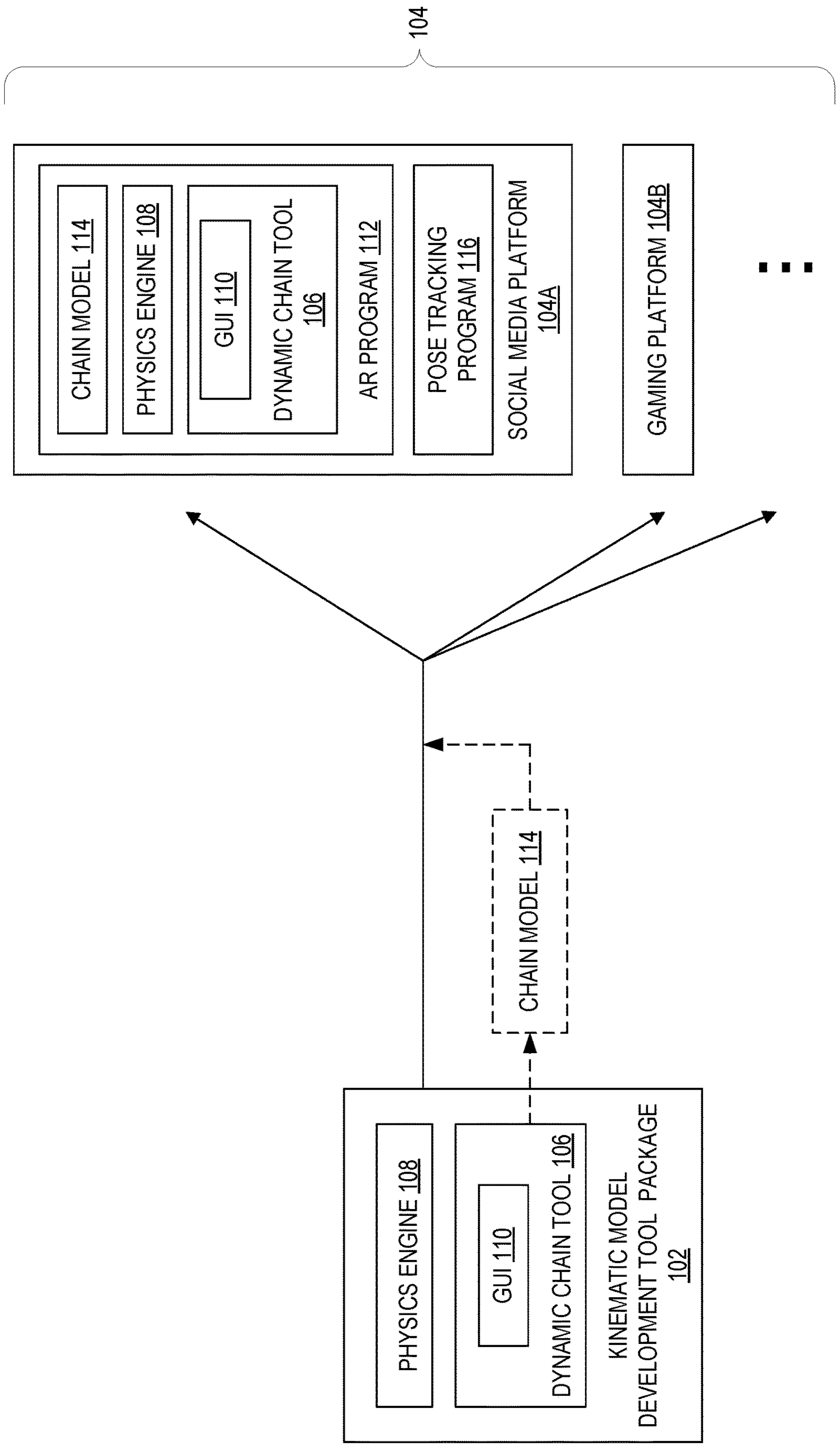
FIG. 1 shows implementation of an example kinematic model development tool across various platforms.

FIG. 1 shows implementation of an example kinematic model development tool package 102 across various platforms 104. In the depicted example, the kinematic model development tool package 102 includes a dynamic chain tool 106 and a physics engine 108 for implementing kinematic joint and chain physics. Various types of physics engines can be utilized, including computer software capable of simulating certain physical systems. To enable ease of use and more flexibility for the developers and users, the dynamic chain tool 106 includes a graphical user interface (GUI) 110 for the creation, modification, and/or customization of dynamic chain elements and adjustment of physical parameters for such elements.

The kinematic model development tool package 102 can be provided to enable developers and users across different platforms 104 for implementing kinematic modeling, such as kinematic joint and chain physics, for various applications. For example, the kinematic model development tool package 102 can be provided to various media content platforms 104, such as social media platforms 104A and gaming platforms 104B. In a more specific example, the kinematic model development tool package 102 can be provided to a short-form video social media platform to enable simulation of kinematic joint and chain physics in AR. One use case includes implementing an AR program 112 on a user's mobile device on such a platform. The AR program 112 can utilize the dynamic chain tool 106 in the kinematic model development tool package 102 to simulate and render a chain model 114. A chain model refers to a graphical computer model that includes a set of mesh models arranged and configured as objects in a tree structure. Objects can be related to one another through a parent/dependent object relationship, creating a hierarchy of objects. Edges of the tree representing the parent/dependent relationship can be logically represented with spring elements that chain together the objects, or mesh models. For kinematic joint and chain physics simulations, movement of a parent object affects movement of a dependent object.

Chain models can be generated through various ways, including through the use of the dynamic chain tool 106, and can be provided through various sources. In some implementations, the chain model 114 is imported from an external source. For example, a dynamic chain tool 106 can be utilized on an external device, such as a laptop/desktop computer, to generate the dynamic chain model 114. Users can adjust and modify settings of the dynamic chain on such devices, and the model 114 can be imported to the mobile device for use with an AR application. In some implementations, the settings of the dynamic chain can be modified on the mobile device that receives the chain model 114. The chain model 114 can also be generated on the local device. For example, the dynamic chain tool 106 and the provided GUI 110 can be used to locally generate a chain model 114 in accordance with a user's preferences.

In some implementations, the chain model 114 is displayed and animated as an overlay on video data recorded from the mobile device's camera. For example, a user on a short-form video social media platform can create a video by combining video data received from their mobile device's camera and the displayed chain model that is overlaid on said video data. The dynamic chain tool 106 can be implemented with various systems on the mobile device to render the chain model 114 and animate it in an interactive manner with content from video data for augmented reality applications. For example, objects can be detected within the video data and tracked for interactions with the simulated chain model 114. Spatial interactions, such as collisions, of the chain model 114 with the detected objects can cause the chain model 114 to behave differently, where such behavior can be simulated using the physics engine 108. In the depicted example of FIG. 1, the device in which the dynamic chain tool is implemented includes a pose tracking program 116 for detecting and tracking objects, such as heads, hands, etc., in the video data. Such detection programs can be implemented using various techniques, including machine vision algorithms. In some implementations, a trained machine learning model is applied to detect and track objects within the video data. As can readily be appreciated, the implementations described above can be applied to video data in real-time or offline.

Figure 2B:
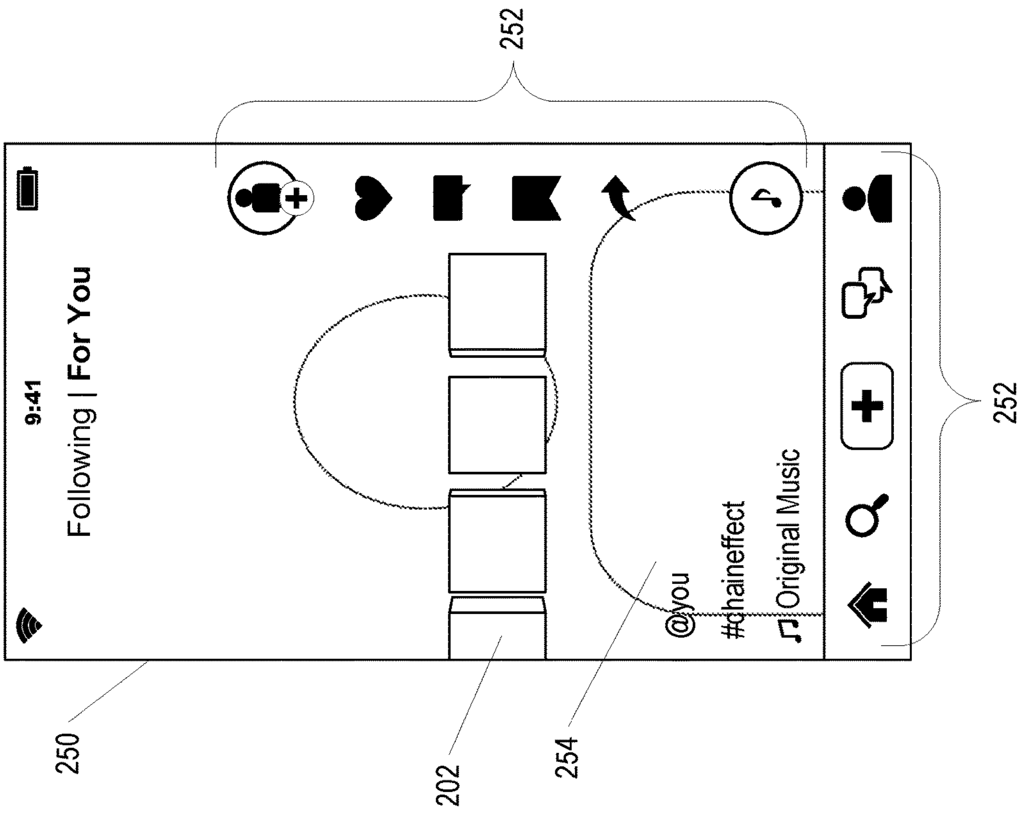
FIGS. 2A and 2B show an example chain model rendered in a dynamic chain tool graphical user interface of the development tool of FIG. 1 and its simulation in an augmented reality environment on a social media platform using the augmented reality program of FIG. 1.
Figure 2A:
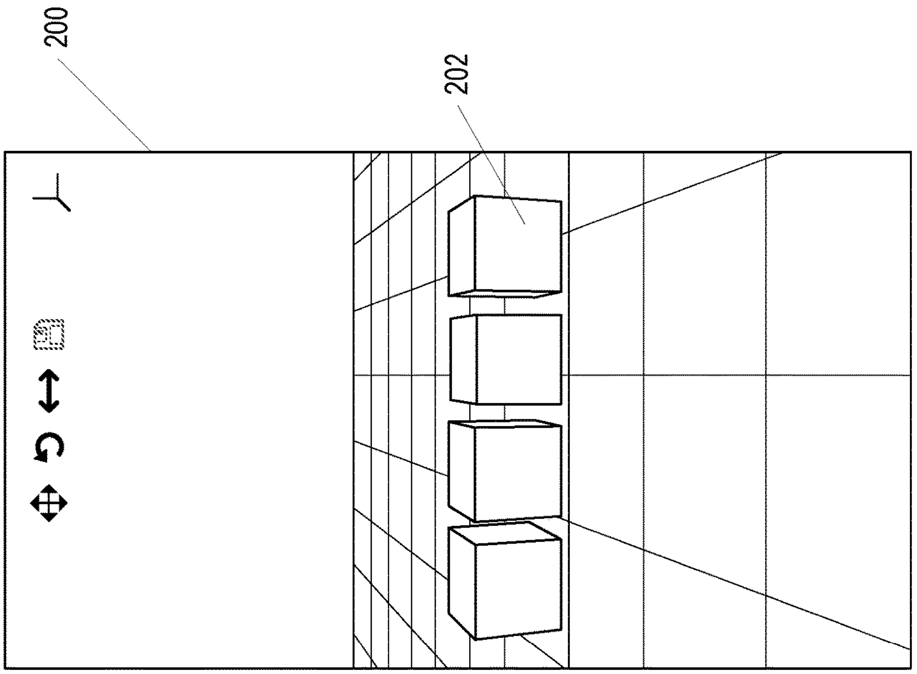

FIG. 2A shows an example dynamic chain tool GUI 200 depicting a three-dimensional chain model 202. Using the dynamic chain tool 106, the chain model 202 can be rendered for a user to perform various modifications and configurations. The dynamic chain tool GUI 200 can be implemented to provide various options and presets for a developer or user to generate different types and configurations of chain models. In the depicted example of FIG. 2A, the chain model 202 includes four objects, represented by cube mesh models in a linear arrangement, with each object (except for the far-right object) being a parent object of the object to its immediate right. For kinematic joint and chain physics simulations, movement of a parent object affects movement of a dependent object. An object can also have multiple dependent objects, creating a branching structure. This allows for a large number of degrees of freedom, enabling simulation of complex movements.

FIG. 2B shows an example social media platform GUI 250 depicting the chain model 202 as a rendered overlay on top of video data. In the depicted example, the social media platform is a short-form video social media platform with a user interface 250 having various button icons 252 for navigation and performing various actions. Example actions include liking, commenting, bookmarking, and sharing the currently displayed short-form video. In a short-form video social media platform, the video data is typically received from a camera of the mobile device implementing the AR application. In the depicted example, the video data is displaying a user's upper body 254. The chain model 202 can be rendered and displayed as an overlay on the video data, allowing it to be simulated in accordance with the user's preferences. For example, the chain model 202 can be simulated to behave in accordance with a force acting upon it. In some implementations, the chain model 202 is anchored to an object in the video data, and simulation of its movements in accordance with various physical systems can be performed using, for example, a physics engine and the dynamic chain tool.

As described above, content in the video data can affect movement of the chain model 202. Content such as objects in the video data can be detected using various techniques, including but not limited to machine vision and machine learning techniques. In some implementations, object detection algorithms are used to detect and track a body part, such as a hand, face, eye, ear, nose, mouth, torso, arm, leg, foot, or buttocks of a person. Collision detection can be performed to determine interactions between the object and the chain model 202, and the resulting movements of the chain model 202 can be simulated and displayed accordingly.

Chain models can be configured in various ways. For example, the chain model 202 depicted in FIGS. 2A and 2B is made up of four different mesh models positioned separately from one another. The relationship between objects (mesh models) can be defined through a parent/dependent relationship, where movement of a parent object in a simulated environment affects movement of a dependent object. The relationship and related physical parameters between objects can be described and implemented as a virtual spring element, which includes various physical parameter attributes that can be used to simulate the objects in accordance with a physical system. These attributes can be configured depending on the preferences of a developer or user. For example, a user can generate chain models with certain physical parameters to mimic real-life objects, such as hair, wigs, accessories, etc.

Movement of a chain model can be simulated with kinematic joint and dynamic chain physics, where mesh models that make up the chain model are simulated as interconnected elements, such as joints and bones, in a virtual environment. Example use cases of chain model simulation can include simulation of the movements of various objects that can be represented using a chain structure, including human body parts such as hair and limbs. The dynamics of the objects within the chain model are determined by several physical parameters. In a dynamic chain system, the movements of an object are determined by the relative positions and velocities of the elements that make up the object. The movements of a parent object will affect the movement of its dependent objects. For example, in a character's arm, the movement of the shoulder joint will affect the movement of the elbow joint, which will in turn affect the movement of the wrist joint. This creates a cascading effect, where the movement of the root object (in this case the shoulder joint) will propagate through the rest of the objects in the chain, ultimately affecting the movement of the end effector (in this case the hand).

Figure 3B:
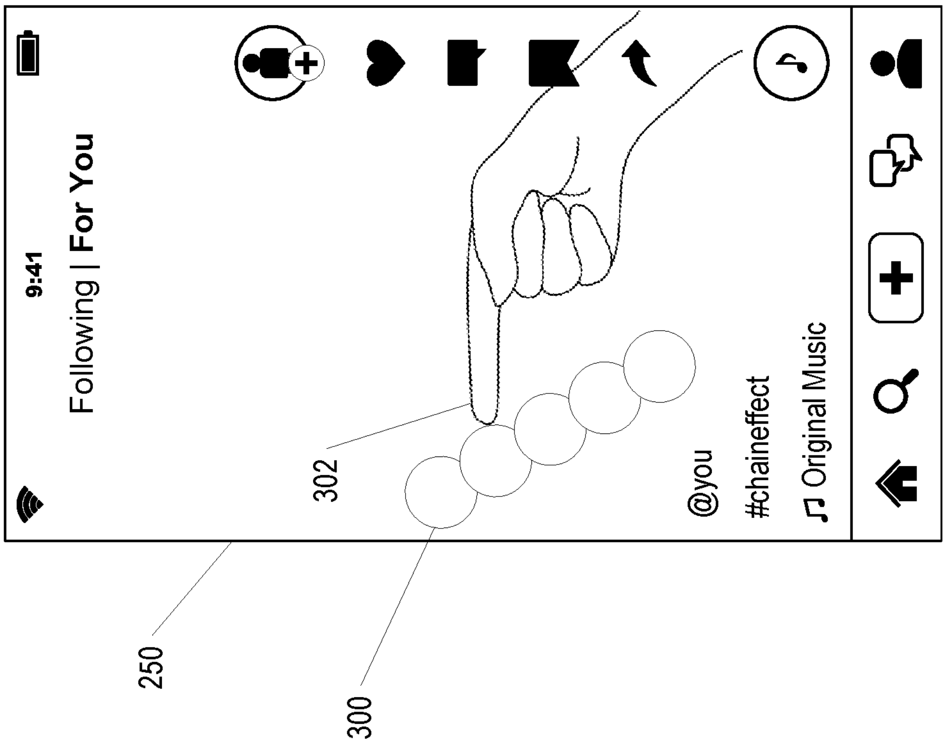
FIGS. 3A and 3B show an applied force on an example chain model by a tracked object in an augmented reality environment displayed through a social media platform using the augmented reality program of FIG. 1.
Figure 3A:
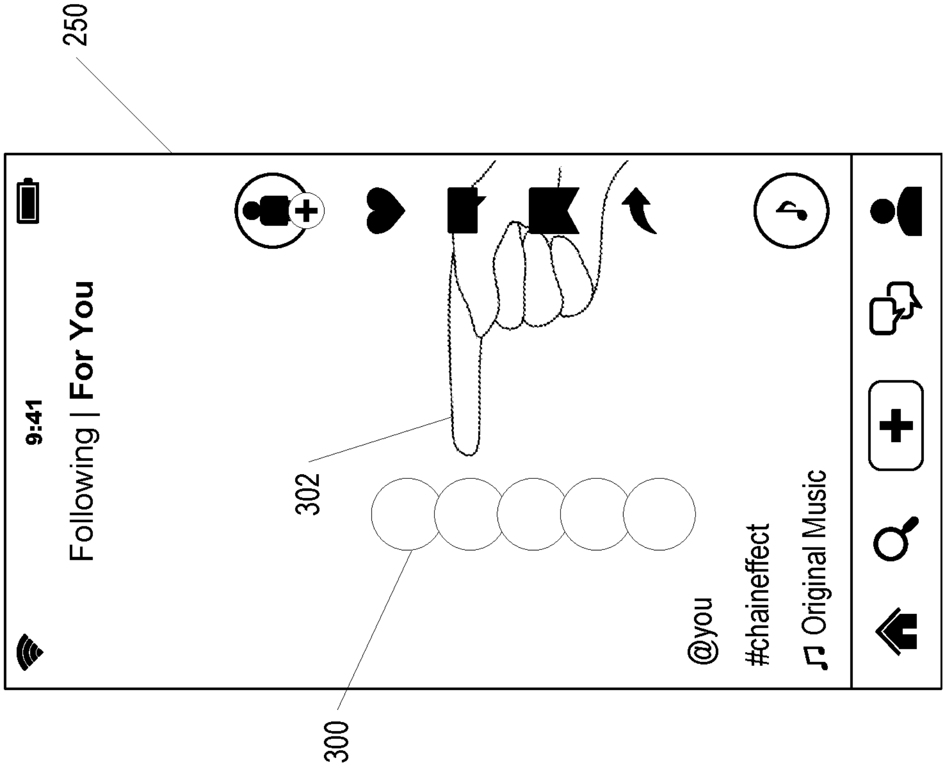

Simulated movements of the chain model can be performed based on force applied to the chain model, such as forces resulting from a collision with an object. Movements of dependent objects can result from movements of their respective parent object. Collision with other objects can include objects such as another computer-generated model or an object detected in video data. FIGS. 3A and 3B show an applied force on an example chain model 300 by a tracked object 302 in an augmented reality environment displayed through a social media platform GUI 250. The chain model 300 includes five sphere mesh models in a linear arrangement. FIG. 3A shows the chain model 300 in a resting position. Upon collision with the tracked object 302 (a finger), movement of the chain model 300 is simulated using its physical parameters and a physics engine. The simulated movements are rendered and displayed accordingly, as shown in FIG. 3B. The finger can be detected and tracked in video data using various machine vision and/or machine learning techniques. In some implementations, a pose tracking algorithm is applied to detect and track objects in video data.

To achieve realistic movement, each object can have various physical parameters that determine how it behaves. Example physical parameters include stiffness, dampening, elasticity, inertia and forces applied. Stiffness governs the resistance of two adjacent objects to return to their original relative distance. Dampening regulates the speed at which the object decelerates. Elasticity controls the degree of resilience of two adjacent objects to return to their original relative orientation. Inertia affects the effort required to move the object. Force controls the amount of force applied to an object in world space, local space, or relative to an object depending on the settings. Different restrictions can also be applied depending on the application. Simulation of certain objects can have different restrictions. For example, simulation of a chain model representing a realistic human arm can include adjusting certain physical parameters to an appropriate setting to enforce a constant relative distance between a parent object and its dependent object(s), similar to simulation of a physical rigid hinge.

Figure 4B:
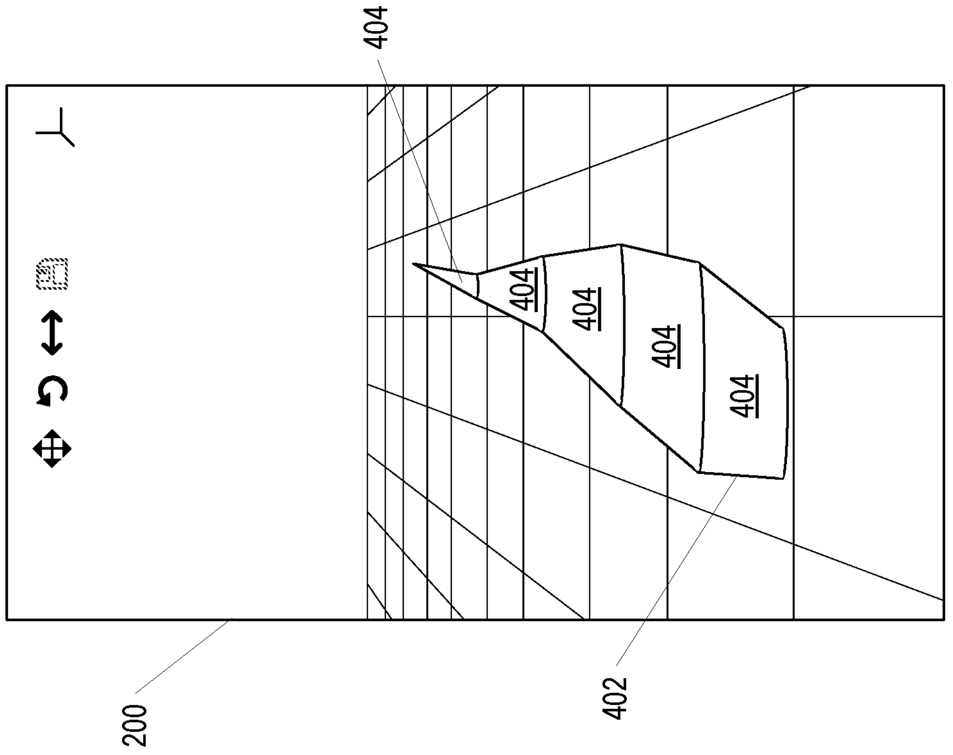
FIGS. 4A and 4B show an example hair chain model and a sub-model rendered in a dynamic chain tool graphical user interface of the development tool of FIG. 1.
Figure 4A:
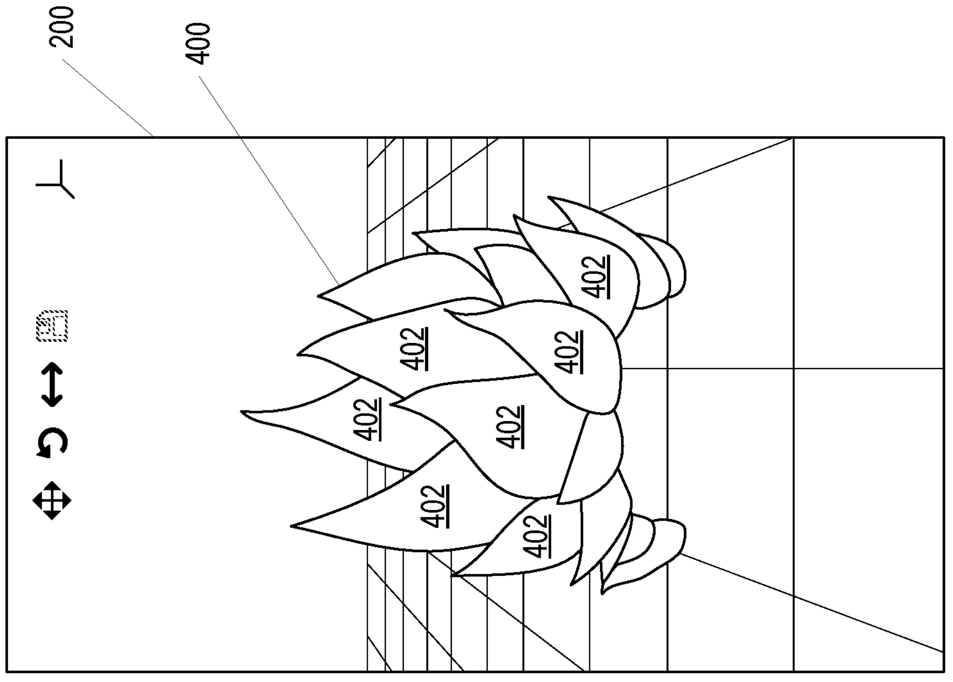

Depending on the application and user's preferences, chain models of other forms and structures can be generated. In some implementations, multiple chain models are rendered together to simulate a desired object. FIG. 4A shows an example hair chain model 400 rendered in a dynamic chain tool GUI 200. The hair chain model 400 can be configured in many ways. In the depicted example, the hair chain model 400 includes a plurality of sub-models 402, which can each be configured as a chain model. Each sub-model 402 corresponds to a different portion of the hair and can be made of a plurality of mesh models. For illustrative purposes, the hair chain model 300 and its constituent sub-models 402 are depicted generally and not as mesh models. The multiple sub-models 402 can also be configured as a single chain model by relating each of the chain models to a single invisible parent node—i.e., a parent node without a mesh model.

Simulating hair can be performed by enforcing certain physical parameters on the chain model. For example, to simulate hair as a rigid object that does not stretch, the virtual spring elements between mesh models within a chain model can be configured to have physical parameters that describe properties more similar to a rod than a spring. This can result in the chain model behaving as physical rigid hinges where the relative positions between predetermined points in pairs of mesh models are constant. FIG. 4B shows a sub-model 402 rendered in the dynamic chain tool GUI 200. The sub-model 402 includes five mesh models 404 arranged in a chain of adjacent objects. The relationship between two adjacent objects, which can be represented as virtual spring elements, can have physical parameters that describe a rigid rod element. For example, in some implementations, the virtual spring elements within the sub-model 402 can have zero values for their elasticity parameter to simulate a rigid element.

As described above, simulation of the kinematic joint and dynamic chain physics can be affected by various physical parameters, including but not limited to stiffness, dampening, elasticity, and inertia. Other considerations affecting the simulation can include attributes of the mesh models within the chain model. For example, each object in the chain model can be simulated as a rigid or deformable body. Other types of forces, such as a constant force applied to the objects in world space, can also be applied. For example, a gravity force can be applied onto the chain model. Forces can also be applied in local space or in a frame of reference relative to another object. In some implementations, the force is applied in camera space. Another consideration includes chain models with fixed ends. In an AR application, displaying the chain model as an overlay on top of video data enables use of content within the video data to affect the chain model's movements. In some implementations, one or more objects within the chain model are anchored to a detected object in the video data.

For example, an object within the chain model can be a fixed end such that the position of said object relative to the detected object is constant. This can be used to simulate various scenarios in an AR application. Examples include simulating digital hair, earrings, and other items affixed relative to an anchor object. Movements of the anchor object can be tracked, and the chain model can be simulated to move accordingly.

Figure 5A:
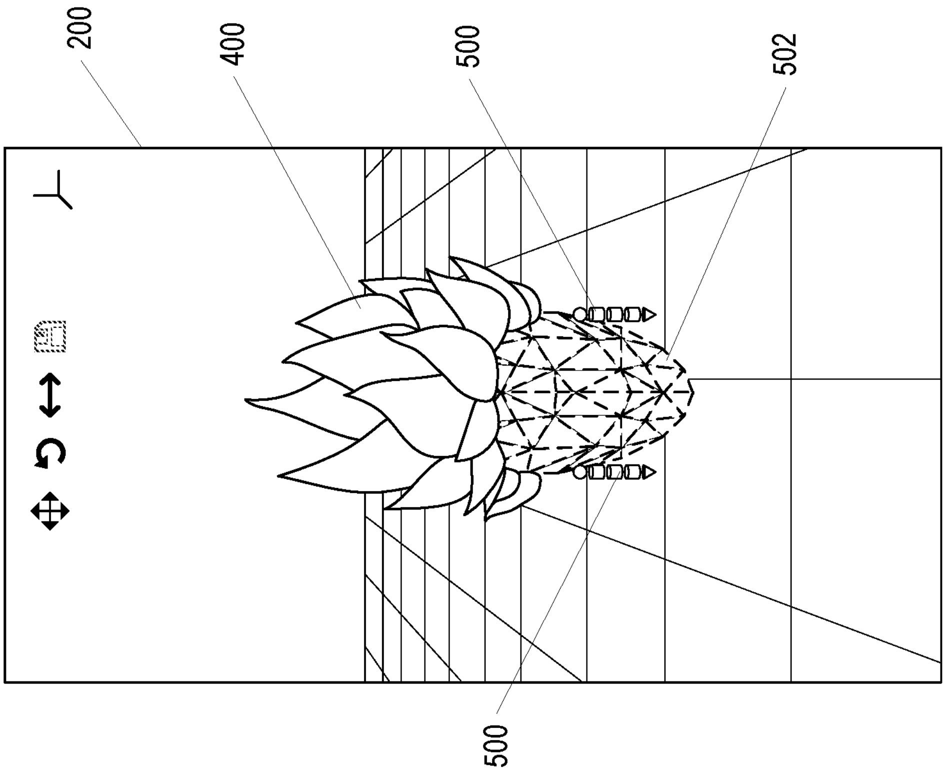
FIGS. 5A and 5B show a hair chain model and earrings chain models affixed to a head object in a dynamic chain tool graphical user interface of the development tool of FIG. 1 and a corresponding tracked head object on a social media platform graphical user interface using the augmented reality program of FIG. 1.

FIG. 5A shows a hair chain model 400 and earrings chain models 500 affixed to a head object 502 in a dynamic chain tool GUI 200. The chain models 400, 500 can be configured in various ways. For example, the hair model 400 can be implemented as one or more chain models. Each bundle of hair can be a separate chain model, or the bundles of hair can be dependent objects of a single invisible parent object. As can readily be appreciated, any type and number of chain models can be affixed to any type of anchor object. For example, the chain model can be an accessory or headwear. In some implementations, the chain model is one of an earring, necklace, pendant, bracelet, necktie, wig, crown, hat, and hood. Furthermore, the anchor object can be any object, including different body parts, such as a hand, face, eye, ear, nose, mouth, torso, arm, leg, foot, or buttocks of a person.

Figure 5B:
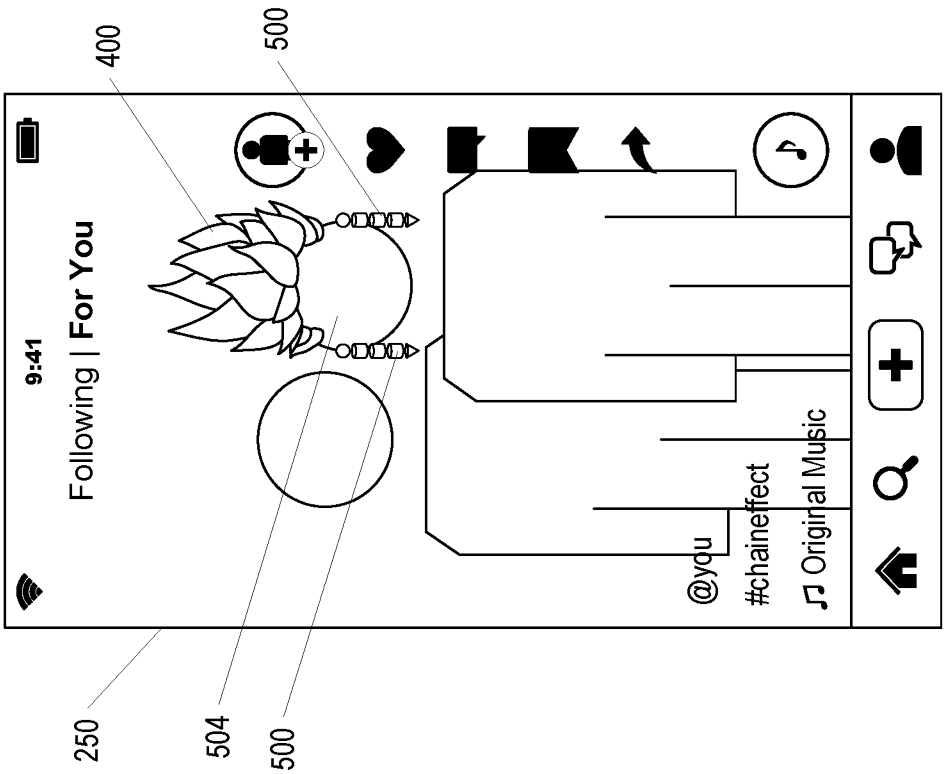

FIG. 5B shows the hair chain model 400 and the earrings chain models 500 affixed to a tracked head object 504 on a social media platform GUI 250. The head object 504 is detected and tracked from the video data, which can be performed using various tracking algorithms and machine vision techniques. In the depicted example, the video data contains two people. In such cases, determination of which head object to track and anchor the hair and earrings models 500, 502 can be decided through various methods, such as by the first detected object or by user selection. Once the chain models 500, 502 are affixed to the tracked object 504, movement of said object (i.e., movement of the person in the video) can cause a resultant movement to the chain models 500, 502 as the positions of the fixed ends of the chain models 500, 502 are restricted to be constant relative to the head object.

Figure 6B:
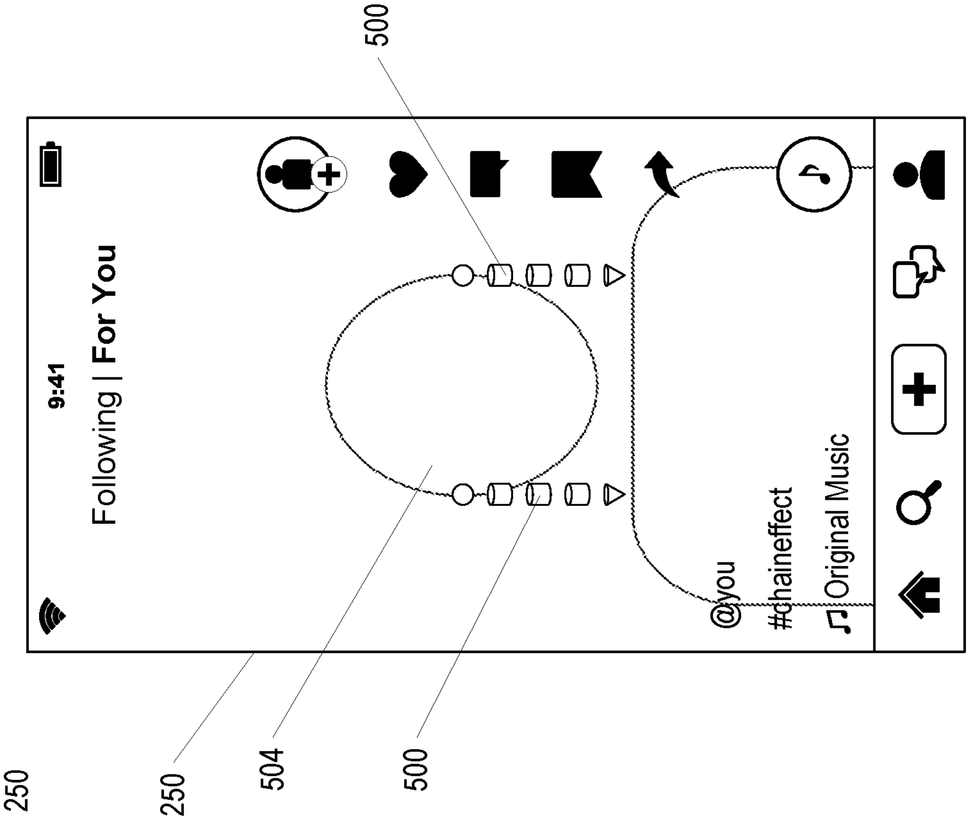
FIGS. 6A and 6B show earrings models affected by an applied force in world space on a social media platform graphical user interface using the augmented reality program of FIG. 1.
Figure 6A:
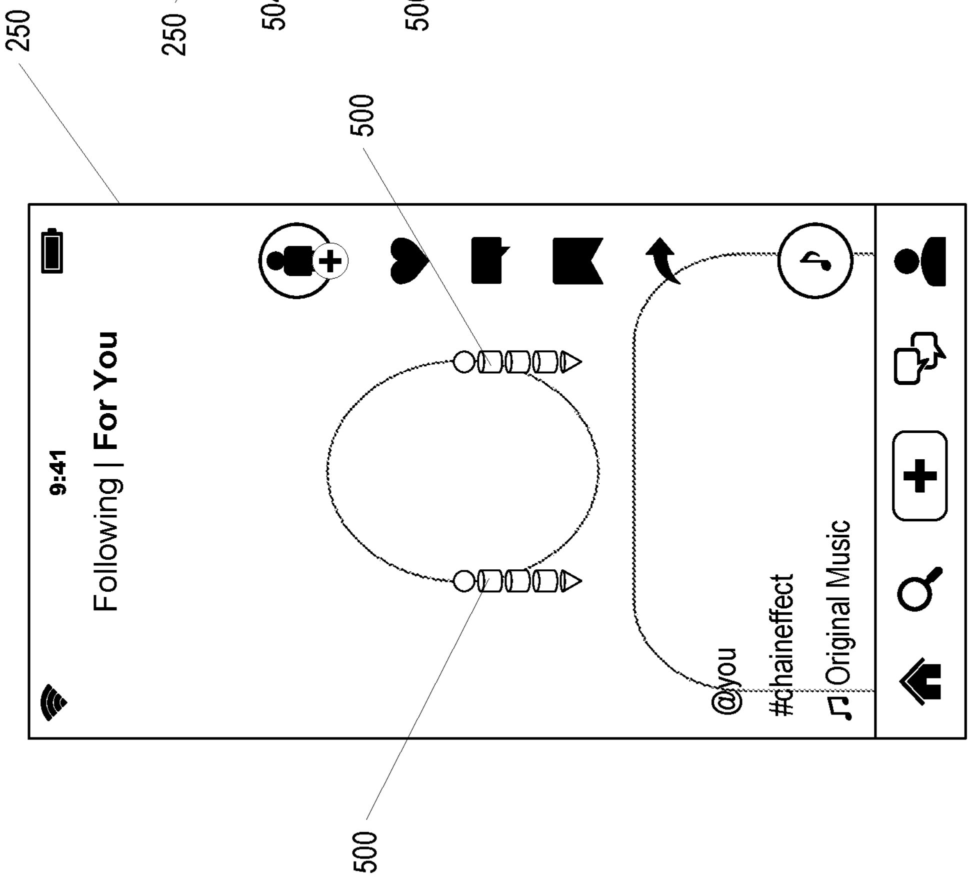

In addition to movements of a tracked anchor object, other forces can also be applied to a chain model, resulting in movement of the chain model. Examples of such forces include collision with other tracked objects and constant forces relative to a predetermined frame of reference. FIGS. 6A and 6B show earrings models 500 affected by an applied force in world space on a social media platform GUI 250. FIG. 6A shows the earring models 500 in a resting position affixed to a tracked head object 504. FIG. 6B shows the earrings models 502 stretched due to an applied downward force, which, in the context of FIG. 6B, can be used to simulate a gravity force. As the tracked object 504 has not moved, the fixed end stays in position (near the person's ears) while the free end is stretched downward. The ability of the earrings models 500 to stretch and the amount of stretching due to the applied force can be determined based on the models' physical parameters.

The forces applied can be configured using the dynamic chain model tool, which provides various configuration options for implementing applied forces. Applied forces can also be designated with respect to different frames of reference, such as relative to world space, local space, or to another object. In some implementations, the applied force is relative to a camera space. Different configurations can be used to simulate different scenarios. For example, gravity can be simulated by applying a force relative to world space. In some implementations, the direction of the applied force can be determined using various methods of determining orientation in the real environment. An example methodology includes the use of a gyroscope of a mobile device to determine the mobile device's orientation and, consequently, its camera's orientation. This information can be used to determine a world space frame of reference, for example. In another example, applied force can be relative to another object to simulate magnetic objects.

Various different types of physical parameters can be adjusted for each object and/or spring element in every chain model. In some implementations, physical parameters are adjusted for each chain model. The adjusted parameters can be used by the physics engine for simulating and rendering the chain model accordingly. A user interface can be provided with graphical control elements for adjusting various parameters associated with one or more chain models, objects, and/or spring elements. Examples of graphical control elements include radio buttons, drop-down menus, check boxes, and text boxes. In some implementations, the physical parameters can be adjusted in real-time as the chain models are displayed as an overlay on the video data.

Figure 7:
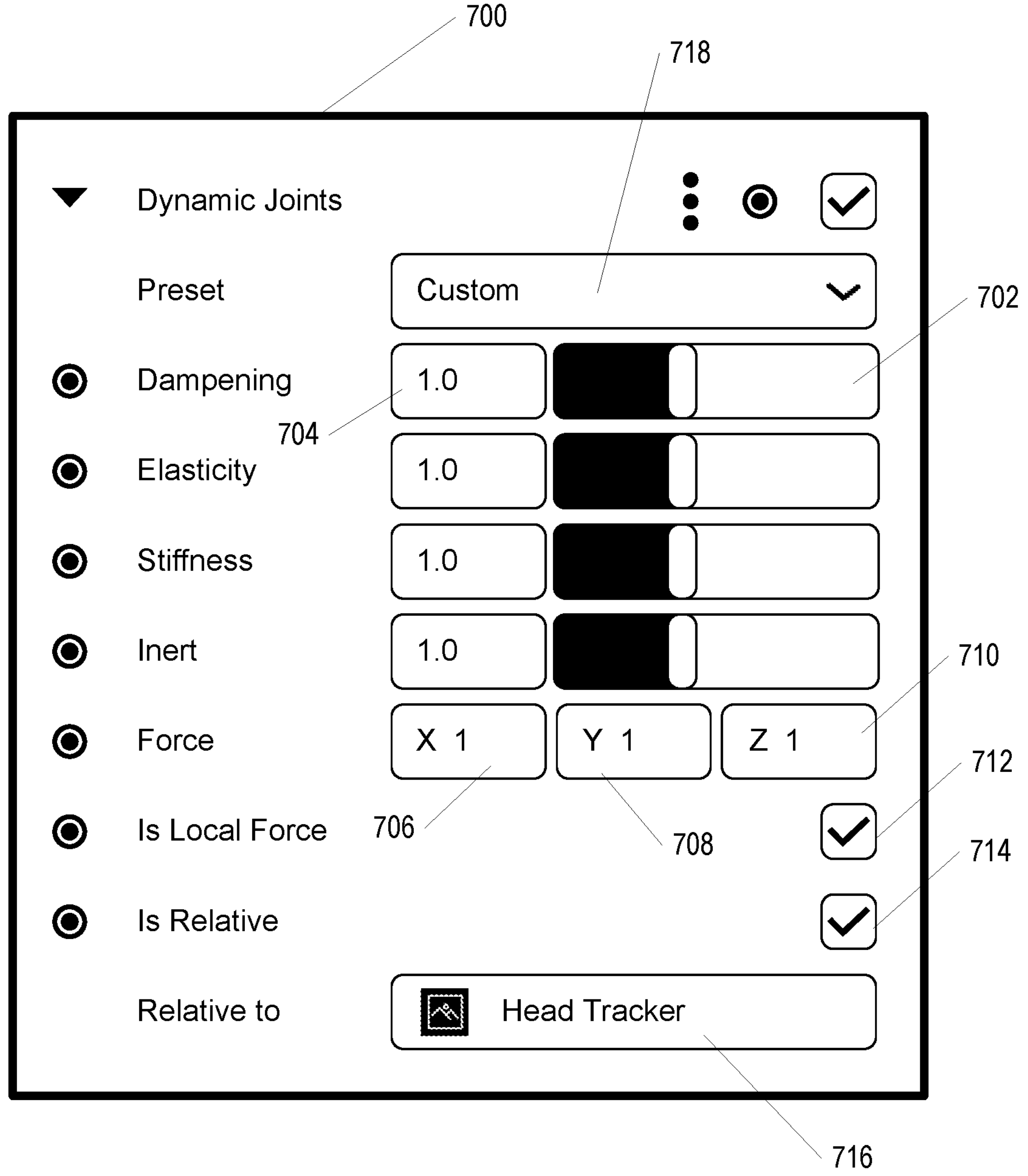
FIG. 7 shows an example chain simulation graphical user interface of the development tool of FIG. 1 with graphical control elements for adjusting various chain simulation parameters.

FIG. 7 shows an example chain simulation GUI 700 with graphical control elements for adjusting various chain simulation parameters. By providing graphical control elements, developers or users can quickly adjust the behavior of an object(s) and the simulated kinematic joint and chain physics off-line or in real-time. The graphical control elements can be configured to adjust physical parameters of an object, such as a mesh model, a spring element, and a chain model. As such, in some implementations, each mesh model and/or spring element can be configured to have different physical parameters. New changes in parameter settings can be used to update the chain model, and a physics engine can be used to simulate the updated chain model accordingly. This makes it easier for developers and users to create realistic and engaging AR experiences with less technical expertise and complexity required to implement the physics simulation while also allowing for greater flexibility and customization in a user-friendly interface. In some implementations, the interface includes visual representation of the objects and connections being simulated so that the user can easily see the effect of their adjustments in real-time. The chain model can also be simulated and displayed with textures applied to its mesh models.

In the depicted example, the chain simulation GUI 700 includes graphical control elements for adjusting physical parameters that include dampening, elasticity, stiffness, inertia, and force. For each of these physical parameters with the exception of "Force", the chain simulation GUI 700 includes a slider graphical control element 702 and a corresponding text box 704 displaying the value. "Dampening" control allows the user to control the amount the object resists movement. A high dampening value will cause the movements between objects to decelerate quickly. "Elasticity" control allows the user to control the amount of force applied to return an object to its original orientation. A high elasticity value will cause an object to accelerate toward their starting position more quickly. "Stiffness" control allows the user to control the amount of resistance an object has to its original orientation. "Inertia" control allows the user to control the amount of movement required to move the object. "Force" allows the user to control the amount of force applied to an object. Any other parameter can also be implemented.

Force can be applied in different frames of reference, such as in local space, world space, or relative to another object. The chain simulation GUI 700 includes text box graphical control elements 706-710 for determining the X, Y, and Z magnitudes of the force to be applied. The chain simulation GUI 700 also includes a checkbox 712 for deciding whether the force applied is local or world space and a checkbox 714 for deciding whether the force is relative to another object. Furthermore, the example GUI includes a graphical control element in the form of a dropdown menu 716 for selecting the object to which the object is relative. The ability to apply force in local or world space and to make the force relative to another object gives more possibilities for dynamic movements. As can readily be appreciated, any type of graphical control element can be utilized for the adjustment of parameters.

In some implementations, a plurality of presets is provided to further streamline the adjustment process. Presets can be customizable or predetermined sets of adjusted parameters. The chain simulation GUI 700 includes a dropdown menu 718 for selecting a preset. As shown, the "Custom" preset is currently selected. Presets can be selected to quickly adjust the parameters to predetermined values. In further implementations, the parameters can be further adjusted after selection of a preset. An example set of named presets can include "Loose," "Dampened," "Springy," "Elastic," "Stiff," and "Rigid." "Loose" simulates an object that has a low level of resistance to movement, allowing for smooth and easy motion. "Dampened" simulates an object with a dampening effect to reduce oscillation. "Springy" simulates an object with a spring-like behavior. "Elastic" simulates an object that is able to stretch and compress, similar to a rubber band. "Stiff" simulates an object with a high level of resistance to movement. "Rigid" simulates an object that is fixed and does not allow for any movement, similar to a welded object but could be broken or shattered under a high force.

The chain simulation GUI 700 can be implemented to adjust parameters for a chain model or individual elements within the chain model. In some implementations, the chain simulation GUI 700 includes options for configuring parameters of a chain model to vary in accordance with a predetermined function. For example, options for varying parameter values across the elements within a chain model can be implemented. The options can include different functions or patterns in which the values can be varied. Example patterns include linear, logarithmic, and exponential increases and decreases in the values of a given parameter across elements within a chain model.

Figure 8:
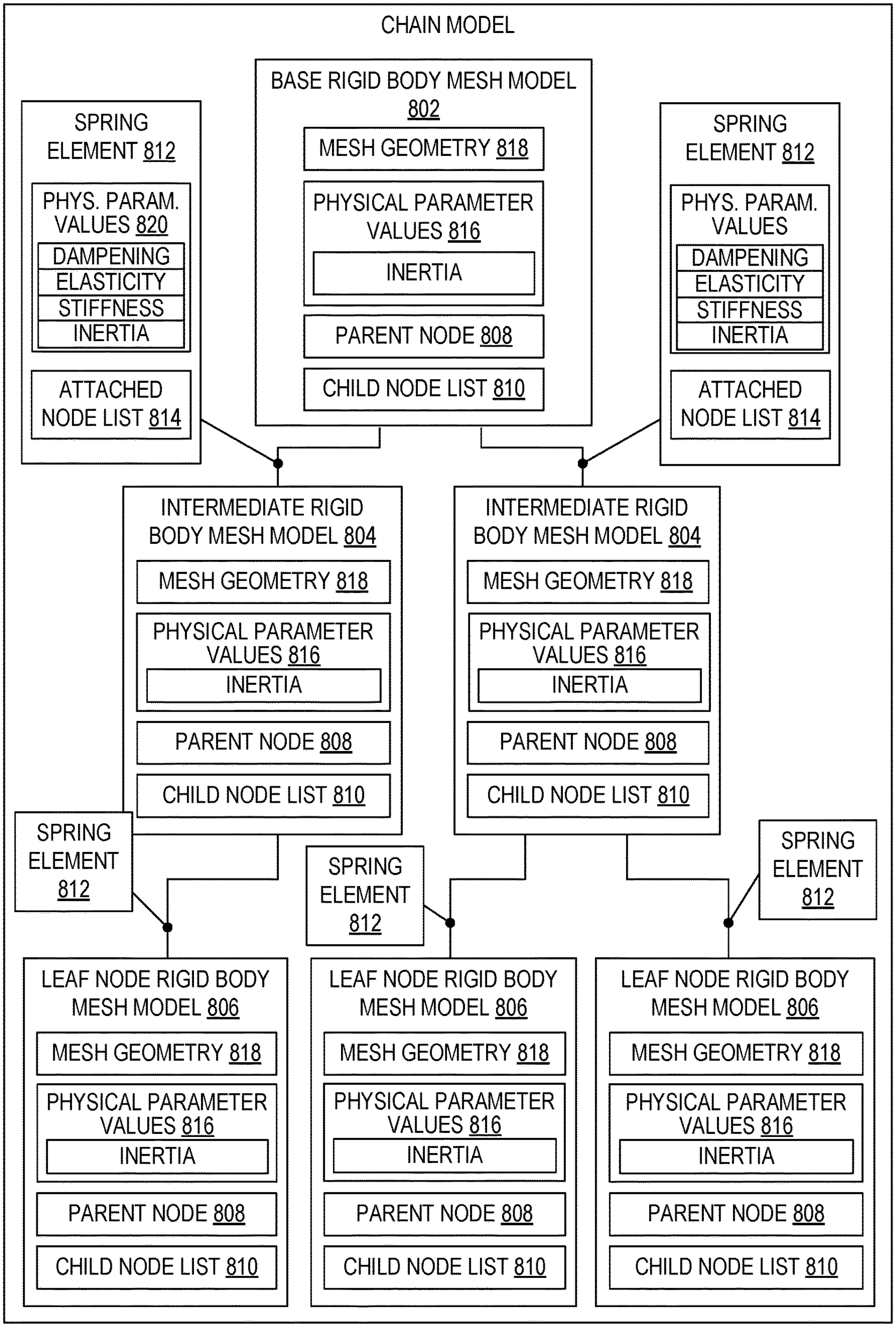
FIG. 8 shows an example data structure for representing a chain model, which may be implemented in the development tool of FIG. 1.

FIG. 8 shows an example data structure 800 for representing a chain model. As described above, a chain model can be represented as a plurality of mesh models and spring elements configured and arranged in a tree structure. As such, the data structure can include mesh models categorized as a base object 802, an intermediate object 804, or a leaf object 806. In the depicted example, the mesh models are rigid body models. Deformable mesh models can also be implemented. To define the tree structure, the mesh model data structure can include information regarding its parent object 808 and dependent object(s) 810. Spring elements 812 logically represent the relationship between parent and dependent objects. The spring elements 812 can include an attached object list 814 that describes the two objects chained together by the respective spring element.

The mesh model data structure can include other information, such as physical parameters 816 and mesh geometry 818. In some implementations, the mesh model data structure includes texture information. In the depicted example, the physical parameters 816 includes information describing the mesh model's inertia. The spring element includes physical parameter information 820 describing its dampening, elasticity, stiffness, and inertia attributed. The data structures can also include additional or different physical parameters. Any set of physical parameters can be utilized for the mesh models and the spring elements. For example, the data structure can include information describing an object's mass. Physical parameters can also be related to one another. For example, as inertia can be expressed as the work required to change the velocity of an object of a given mass, mass and inertia can be correlated to one another according to a predefined relationship. Data structures of other configurations can be implemented. For example, a chain model can be described with physical parameters that affect all objects and elements within the chain model. In such cases, the physical parameters can be recorded in a single instance, such as in the base mesh model data structure. In some implementations, the mesh model data structure stores physical parameter information that is applied to one or more adjoining spring elements.

Figure 9:
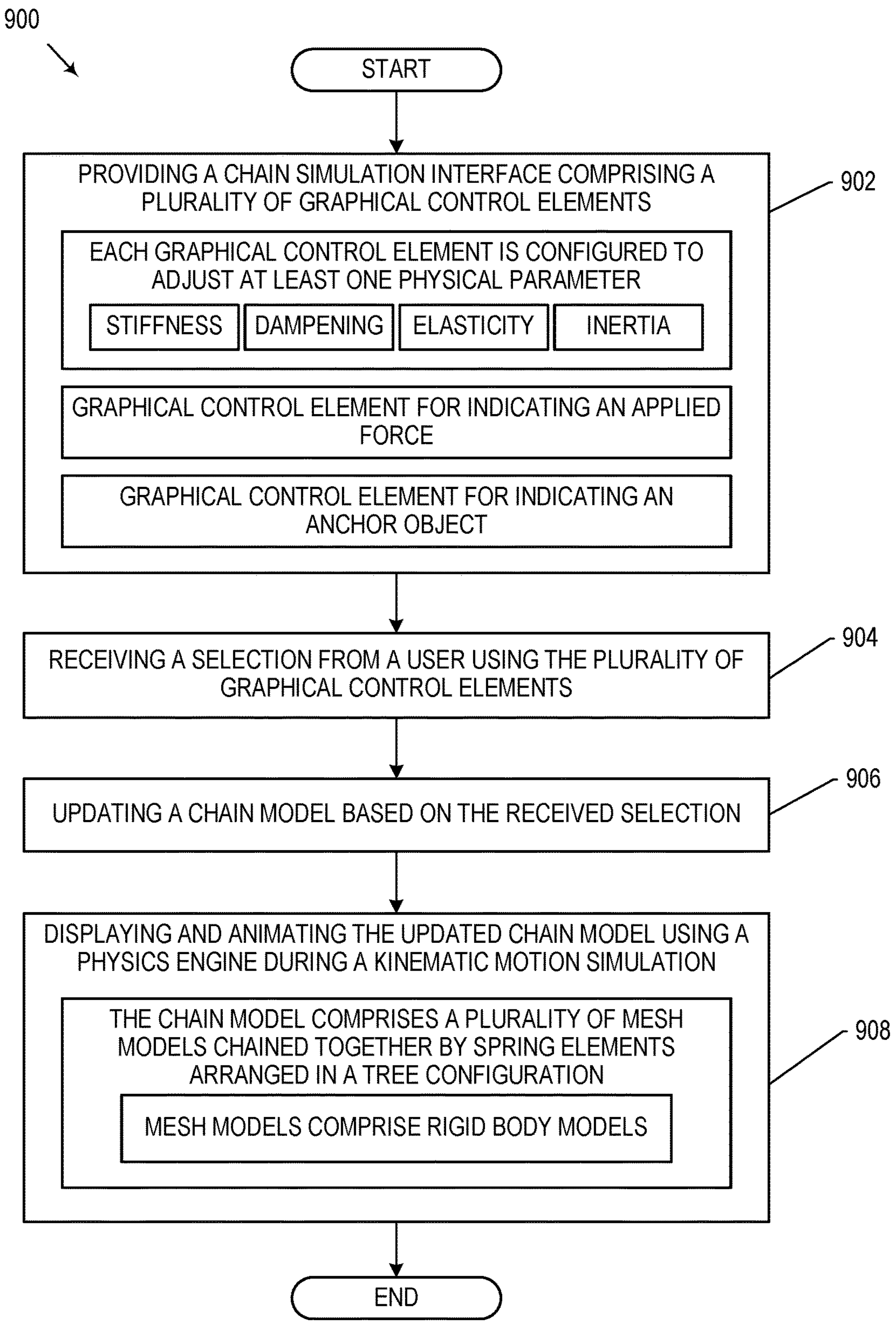
FIG. 9 shows a flow diagram illustrating an example method for kinematic joint simulation, which may be implemented using any suitable hardware and software implementing the development tool of FIG. 1.

FIG. 9 shows a flow diagram illustrating an example method 900 for kinematic joint simulation. At 902, the method 900 includes providing a chain simulation interface that includes a plurality of graphical control elements. The chain simulation interface can be a GUI that allows a user to select a chain model or an element within a chain model to configure. For example, the chain simulation interface can include a graphical control element for selecting which element, such as a spring element, a mesh model, or a chain model, to configure. Graphical control elements can be implemented for various functionalities. In some implementations, the plurality of graphical control elements includes at least one graphical control element for adjusting one or more physical parameters. Example physical parameters include but are not limited to stiffness, dampening, elasticity, and inertia.

In some implementations, the plurality of graphical control elements includes a graphical control element for selecting a preset. A preset corresponds to a predetermined selection for at least one of the plurality of graphical control elements. In some implementations, the user can further adjust the parameters after a preset is selected. Another type of graphical control element that can be implemented includes a graphical control element for indicating whether there is an applied force in the simulation. Applied force can be included in the simulation of the chain model with respect to a frame of reference. For example, the simulation can include applied force that is in local space, in world space, or relative to an object. In some implementations, the applied force is relative to a camera space. The chain simulation interface can include at least one graphical control element for indicating whether the force applied is in local space, world space, or relative to an object.

In some implementations, the plurality of graphical control elements includes a graphical control element for indicating an anchor object. For example, a dropdown menu can be implemented for the user to select an object to which a mesh model within the chain model is attached. This anchored relationship defines and enforces how the mesh model is relatively positioned with respect to the anchor object. Example anchor objects can include various objects or body parts, such as a hand, face, eye, ear, nose, mouth, torso, arm, leg, foot, and buttocks of a user in view of the camera. During simulation, the anchor object can be determined in video data received from a camera. Various methods can be implemented to determine the anchor object. In some implementations, a pose tracking algorithm is implemented to detect and track the anchor object. A machine learning algorithm can also be utilized to detect and track the anchor object. For example, the location of the anchor object can be determined by applying a trained machine learning model.

At 904, the method 900 includes receiving a selection from a user using the plurality of graphical control elements. The selection can include adjusted parameter values corresponding to an element, such as a spring element, a mesh model, or a chain model.

At 906, the method 900 includes updating a chain model based on the received selection. Updating the chain model can include updating the parameters that were adjusted in the received selection. Depending on how the chain model is implemented, the updating method can vary. For example, in some implementations, the chain model is represented by a data structure that stores the parameter information. Updating the chain model in such implementations can include updating the parameter information.

At 908, the method 900 includes displaying and animating the updated chain model using a physics engine during a kinematic motion simulation. Chain models can be any three-dimensional computer model. For example, the chain model can represent a real-world item, such as an earring, necklace, pendant, bracelet, necktie, wig, crown, hat, and hood. In some implementations, the chain model is displayed and animated on a display in real-time as an overlay on video data received from a camera. Such implementations can be performed on various devices, including computing devices such as mobile devices. The chain model can be implemented in many different ways. In some implementations, the chain model includes a plurality of mesh models chained together by spring elements arranged in a tree configuration. The mesh models can be simulated as rigid body models or deformable body models.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
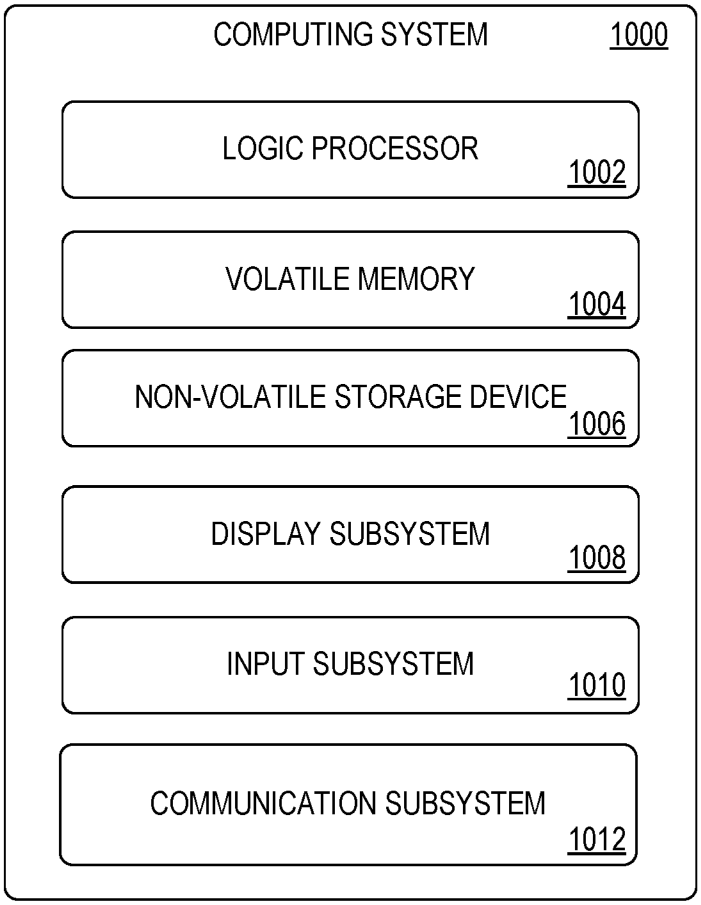
FIG. 10 shows a schematic view of an example computing environment in which the development tool of FIG. 1 may be deployed.

FIG. 10 schematically shows a non-limiting embodiment of a computing system 1000 that can enact one or more of the methods and processes described above. Computing system 1000 is shown in simplified form. Computing system 1000 may embody an example computing environment in which the development tool of FIG. 1 may be deployed. Computing system 1000 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 1000 includes a logic processor 1002, volatile memory 1004, and a non-volatile storage device 1006. Computing system 1000 may optionally include a display subsystem 1008, input subsystem 1010, communication subsystem 1012, and/or other components not shown in FIG. 10.

Logic processor 1002 includes one or more physical devices configured to execute instructions. For example, the logic processor 1002 may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 1002 may include one or more physical processors (hardware) configured to execute software instructions. Additionally or alternatively, the logic processor 1002 may include one or more hardware logic circuits or firmware devices configured to execute hardware-implemented logic or firmware instructions. Processors of the logic processor 1002 may be single-core or multi-core, and the instructions executed thereon may be configured for sequential, parallel, and/or distributed processing. Individual components of the logic processor 1002 optionally may be distributed among two or more separate devices, which may be remotely located and/or configured for coordinated processing. Aspects of the logic processor 1002 may be virtualized and executed by remotely accessible, networked computing devices configured in a cloud-computing configuration. In such a case, these virtualized aspects are run on different physical logic processors of various different machines, it will be understood.

Non-volatile storage device 1006 includes one or more physical devices configured to hold instructions executable by the logic processors to implement the methods and processes described herein. When such methods and processes are implemented, the state of non-volatile storage device 1006 may be transformed—e.g., to hold different data.

Non-volatile storage device 1006 may include physical devices that are removable and/or built-in. Non-volatile storage device 1006 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1006 may include nonvolatile, dynamic, static, read/write, read-only, sequential-access, location-addressable, file-addressable, and/or content-addressable devices. It will be appreciated that non-volatile storage device 1006 is configured to hold instructions even when power is cut to the non-volatile storage device 1006.

Volatile memory 1004 may include physical devices that include random access memory. Volatile memory 1004 is typically utilized by logic processor 1002 to temporarily store information during processing of software instructions. It will be appreciated that volatile memory 1004 typically does not continue to store instructions when power is cut to the volatile memory 1004.

Aspects of logic processor 1002, volatile memory 1004, and non-volatile storage device 1006 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1000 typically implemented in software by a processor to perform a particular function using portions of volatile memory, which function involves transformative processing that specially configures the processor to perform the function. Thus, a module, program, or engine may be instantiated via logic processor 1002 executing instructions held by non-volatile storage device 1006, using portions of volatile memory 1004. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1008 may be used to present a visual representation of data held by non-volatile storage device 1006. The visual representation may take the form of a graphical user interface (GUI). As the herein described methods and processes change the data held by the non-volatile storage device, and thus transform the state of the non-volatile storage device, the state of display subsystem 1008 may likewise be transformed to visually represent changes in the underlying data. Display subsystem 1008 may include one or more display devices utilizing virtually any type of technology. Such display devices may be combined with logic processor 1002, volatile memory 1004, and/or non-volatile storage device 1006 in a shared enclosure, or such display devices may be peripheral display devices.

When included, input subsystem 1010 may comprise or interface with one or more user-input devices such as a keyboard, mouse, touch screen, or game controller. In some embodiments, the input subsystem 1010 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1012 may be configured to communicatively couple various computing devices described herein with each other, and with other devices. Communication subsystem 1012 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 1000 to send and/or receive messages to and/or from other devices via a network such as the Internet.

The following paragraphs provide additional description of the subject matter of the present disclosure. One aspect provides for a computing device for kinematic joint simulation, the computing device comprising a display and a processor coupled to a storage system that stores instructions, which, upon execution by the processor, cause the processor to present a chain simulation interface comprising a plurality of graphical control elements, each graphical control element configured to adjust at least one physical parameter, receive a selection from a user using the plurality of graphical control elements, update a chain model based on the received selection, and display and animate the updated chain model on the display using a physics engine during a kinematic motion simulation, wherein the chain model comprises a plurality of rigid body mesh models chained together by spring elements arranged in a tree configuration, to thereby form a rigged skeleton, where movement of a parent rigid body mesh model during the kinematic motion simulation generates forces in at least one adjoining spring element that in turn induces movement of a dependent rigid body mesh model. In this aspect, additionally or alternatively, the selection includes values for physical parameters of the spring elements. In this aspect, additionally or alternatively, the plurality of graphical control elements comprises a graphical control element configured to adjust a physical parameter selected from the group consisting of: stiffness, dampening, elasticity, and inertia. In this aspect, additionally or alternatively, the computing device further comprises a camera, wherein the chain model is displayed and animated on the display in real-time as an overlay on video data received from the camera. In this aspect, additionally or alternatively, the plurality of graphical control elements comprises a graphical control element comprising a plurality of presets, wherein each preset corresponds to a predetermined selection for at least one of the plurality of graphical control elements. In this aspect, additionally or alternatively, the plurality of graphical control elements comprises a graphical control element configured to indicate a force applied on the chain model and at least one graphical control element for indicating whether the force applied is in local space, world space, or relative to an object. In this aspect, additionally or alternatively, the plurality of graphical control elements comprises a graphical control element for indicating an anchor object to which a rigid body mesh model in the plurality of rigid body mesh models is relatively positioned. In this aspect, additionally or alternatively, the computing device further comprises a camera, wherein a location of the anchor object is determined by applying a trained machine learning model to video data received from the camera. In this aspect, additionally or alternatively, the anchor object is a body part of a person selected from the group consisting of: hand, face, eye, ear, nose, mouth, torso, arm, leg, foot, and buttocks of a user. In this aspect, additionally or alternatively, the chain model is an item selected from the group consisting of: earring, necklace, pendant, bracelet, necktie, wig, crown, hat, and hood.

Another aspect provides for a method for kinematic joint simulation, the method comprising providing a chain simulation interface comprising a plurality of graphical control elements, each graphical control element configured to adjust at least one physical parameter, receiving a selection from a user using the plurality of graphical control elements, updating a chain model based on the received selection, and displaying and animating the updated chain model using a physics engine during a kinematic motion simulation, wherein the chain model comprises a plurality of rigid body mesh models chained together by spring elements arranged in a tree configuration, to thereby form a rigged skeleton, where movement of a parent rigid body mesh model during the kinematic motion simulation generates forces in at least one adjoining spring element that in turn induces movement of a dependent rigid body mesh model. In this aspect, additionally or alternatively, the plurality of graphical control elements comprises a graphical control element configured to adjust a physical parameter selected from the group consisting of: stiffness, dampening, elasticity, and inertia. In this aspect, additionally or alternatively, the chain model is displayed and animated on a display of a computing device in real-time as an overlay on video data received from a camera of the computing device. In this aspect, additionally or alternatively, the plurality of graphical control elements comprises a graphical control element comprising a plurality of presets, wherein each preset corresponds to a predetermined selection for at least one of the plurality of graphical control elements. In this aspect, additionally or alternatively, the plurality of graphical control elements comprises a graphical control element configured to indicate a force applied on the chain model and at least one graphical control element for indicating whether the force applied is in local space, world space, or relative to an object. In this aspect, additionally or alternatively, the plurality of graphical control elements comprises a graphical control element for indicating an anchor object to which a rigid body mesh model in the plurality of rigid body mesh models is relatively positioned. In this aspect, additionally or alternatively, a location of the anchor object is determined by applying a trained machine learning model to video data received from a camera. In this aspect, additionally or alternatively, the anchor object is a body part of a person selected from the group consisting of: hand, face, eye, ear, nose, mouth, torso, arm, leg, foot, and buttocks of a user. In this aspect, additionally or alternatively, the chain model is an item selected from the group consisting of: earring, necklace, pendant, bracelet, necktie, wig, crown, hat, and hood.

Another aspect provides for a mobile device for kinematic joint simulation, the mobile device comprising a display, a camera, and a processor coupled to a storage system that stores instructions, which, upon execution by the processor, cause the processor to present a chain simulation interface using the display, wherein the chain simulation interface comprises a plurality of graphical control elements, each graphical control element configured to adjust at least one physical parameter selected from the group consisting of: stiffness, dampening, elasticity, and inertia, receive a selection from a user using the plurality of graphical control elements, update a chain model based on the received selection, and display and animate the updated chain model on the display in real-time as an overlay on video data received from the camera, wherein the updated chain model is animated using a physics engine during a kinematic motion simulation, and wherein the chain model comprises a plurality of rigid body mesh models chained together by spring elements arranged in a tree configuration, to thereby form a rigged skeleton, where movement of a parent rigid body mesh model during the kinematic motion simulation generates forces in at least one adjoining spring element that in turn induces movement of a dependent rigid body mesh model.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device for kinematic joint simulation, the computing device comprising:
- a display; and
- a processor coupled to a storage system that stores instructions, which, upon execution by the processor, cause the processor to:
  - present a chain simulation interface comprising a plurality of graphical control elements, each graphical control element configured to adjust at least one physical parameter;
  - receive a selection from a user using the plurality of graphical control elements;
  - update a chain model based on the received selection, wherein the chain model is stored as a data structure comprising:
    - a plurality of rigid body mesh models, each rigid body mesh model comprising:
      - mesh geometry data;
      - a first set of physical parameters; and
      - information describing a relationship with a different rigid body mesh model; and
    - a plurality of spring elements, each spring element comprising:
      - a second set of physical parameters comprising one or more of a stiffness parameter, a dampening parameter, an elasticity parameter, or an inertia parameter; and
      - information describing two rigid body mesh models connected by the spring element; and
  - display and animate the updated chain model on the display using a physics engine during a kinematic motion simulation, wherein the chain model is arranged in a tree configuration such that each edge of the tree configuration stores the second set of physical parameters of a spring element of the plurality of spring elements, to thereby form a rigged skeleton, where movement of a parent rigid body mesh model during the kinematic motion simulation generates forces in at least one adjoining spring element that in turn induces movement of a dependent rigid body mesh model, and wherein the chain simulation interface enables adjustment of parameters for individual elements within the chain model.

2. The computing device of claim 1, wherein the selection includes values for physical parameters of the spring elements.

3. The computing device of claim 1, wherein the plurality of graphical control elements comprises a graphical control element configured to adjust a physical parameter selected from the group consisting of: stiffness, dampening, elasticity, and inertia.

4. The computing device of claim 1, further comprising a camera, wherein the chain model is displayed and animated on the display in real-time as an overlay on video data received from the camera.

5. The computing device of claim 1, wherein the plurality of graphical control elements comprises a graphical control element comprising a plurality of presets, wherein each preset corresponds to a predetermined selection for at least one of the plurality of graphical control elements.

6. The computing device of claim 1, wherein the plurality of graphical control elements comprises a graphical control element configured to indicate a force applied on the chain model and at least one graphical control element for indicating whether the force applied is in local space, world space, or relative to an object.

7. The computing device of claim 1, wherein the plurality of graphical control elements comprises a graphical control element for indicating an anchor object to which a rigid body mesh model in the plurality of rigid body mesh models is relatively positioned.

8. The computing device of claim 7, further comprising a camera, wherein a location of the anchor object is determined by applying a trained machine learning model to video data received from the camera.

9. The computing device of claim 7, wherein the anchor object is a body part of a person selected from the group consisting of: hand, face, eye, ear, nose, mouth, torso, arm, leg, foot, and buttocks of a user.

10. The computing device of claim 7, wherein the chain model is an item selected from the group consisting of: earring, necklace, pendant, bracelet, necktie, wig, crown, hat, and hood.

11. A method for kinematic joint simulation, the method comprising:

providing a chain simulation interface comprising a plurality of graphical control elements, each graphical control element configured to adjust at least one physical parameter;

receiving a selection from a user using the plurality of graphical control elements;

updating a chain model based on the received selection, wherein the chain model is stored as a data structure comprising:

a plurality of rigid body mesh models, each rigid body mesh model comprising:

mesh geometry data;

a first set of physical parameters; and information describing a relationship with a different rigid body mesh model; and a plurality of spring elements, each spring element comprising:

a second set of physical parameters comprising one or more of a stiffness parameter, a dampening parameter, an elasticity parameter, or an inertia parameter; and information describing two rigid body mesh models connected by the spring element; and displaying and animating the updated chain model using a physics engine during a kinematic motion simulation, wherein the chain model is arranged in a tree configuration such that each edge of the tree configuration are represented by stores the second set of physical parameters of a spring element of the plurality of spring elements, to thereby form a rigged skeleton, where movement of a parent rigid body mesh model during the kinematic motion simulation generates forces in at least one adjoining spring element that in turn induces movement of a dependent rigid body mesh model, and wherein the chain simulation interface enables adjustment of parameters for individual elements within the chain model.

12. The method of claim 11, wherein the plurality of graphical control elements comprises a graphical control element configured to adjust a physical parameter selected from the group consisting of: stiffness, dampening, elasticity, and inertia.

13. The method of claim 11, wherein the chain model is displayed and animated on a display of a computing device in real-time as an overlay on video data received from a camera of the computing device.

14. The method of claim 11, wherein the plurality of graphical control elements comprises a graphical control element comprising a plurality of presets, wherein each preset corresponds to a predetermined selection for at least one of the plurality of graphical control elements.

15. The method of claim 11, wherein the plurality of graphical control elements comprises a graphical control element configured to indicate a force applied on the chain model and at least one graphical control element for indicating whether the force applied is in local space, world space, or relative to an object.

16. The method of claim 11, wherein the plurality of graphical control elements comprises a graphical control element for indicating an anchor object to which a rigid body mesh model in the plurality of rigid body mesh models is relatively positioned.

17. The method of claim 16, wherein a location of the anchor object is determined by applying a trained machine learning model to video data received from a camera.

18. The method of claim 16, wherein the anchor object is a body part of a person selected from the group consisting of: hand, face, eye, ear, nose, mouth, torso, arm, leg, foot, and buttocks of a user.

19. The method of claim 16, wherein the chain model is an item selected from the group consisting of: earring, necklace, pendant, bracelet, necktie, wig, crown, hat, and hood.

20. A mobile device for kinematic joint simulation, the mobile device comprising:

a display;

a camera; and a processor coupled to a storage system that stores instructions, which, upon execution by the processor, cause the processor to:

present a chain simulation interface using the display, wherein the chain simulation interface comprises a plurality of graphical control elements, each graphical control element configured to adjust at least one physical parameter selected from the group consisting of: stiffness, dampening, elasticity, and inertia;

receive a selection from a user using the plurality of graphical control elements;

update a chain model based on the received selection, wherein the chain model is stored as a data structure comprising:

a plurality of rigid body mesh models, each rigid body mesh model comprising:

mesh geometry data;

a first set of physical parameters; and information describing a relationship with a different rigid body mesh model; and a plurality of spring elements, each spring element comprising:

a second set of physical parameters comprising one or more of a stiffness parameter, a dampening parameter, an elasticity parameter, or an inertia parameter; and information describing two rigid body mesh models connected by the spring element; and display and animate the updated chain model on the display in real-time as an overlay on video data received from the camera, wherein the updated chain model is animated using a physics engine during a kinematic motion simulation, and wherein the chain model is arranged in a tree configuration such that each edge of the tree configuration stores the second set of physical parameters of a spring element of the plurality of spring elements, to thereby form a rigged skeleton, where movement of a parent rigid body mesh model during the kinematic motion simulation generates forces in at least one adjoining spring element that in turn induces movement of a dependent rigid body mesh model, and wherein the chain simulation interface enables adjustment of parameters for individual elements within the chain model.

* * * * *